United States Patent Office 2,840,537
Patented June 24, 1958

2,840,537

CONTINUOUS METHOD OF POLYCONDENSING DIOL ESTERS OF TEREPHTHALIC ACID IN A SOLVENT

Johannes Kleine, Munchen, Erhard Siggel, Laudenbach, Main, and Richard Gerlach, Obernburg, Main, Germany, assignors to Vereinigte Glanzstoff-Fabriken A. G., Wuppertal-Elberfeld, Germany, a corporation of Germany No Drawing. Application August 3, 1954
Serial No. 447,642

Claims priority, application Germany August 3, 1953

4 Claims. (Cl. 260—33.6)

This invention relates to a method of continuously condensing diol esters of terephthalic acid in organic solvents while vapors of said solvents are passed therethrough.

It is known that the polycondensation of diol esters of terephthalic acid can be carried out with solutions of said esters in organic solvents. According to this method the diol ester is dissolved in organic solvents or in mixtures of those solvents; and the polycondensation is carried out, preferably without the application of pressure, while one part of the diol contained in the starting compound is split off. It has been proposed that organic compounds be used as solvents for the polycondensation wherein such compounds have two cyclic nuclei, linked to each other either directly or through —O—, —[CH$_2$]$_n$— groups ($n=1-4$), and either or both may be partly or completely hydrogenated.

It has been found that the condensation of the diol esters of terephthalic acid can be effectuated in a continuous operation by causing a dilute solution of the glycol ester to flow slowly through a vertically disposed heated reaction vessel. The temperature of the reaction vessel is simultaneously held at 220°–265° C., the temperature gradient within this range increasing from the upper to the lower part of the vessel. Moreover, a vaporized solvent is conducted through the reaction mass. As a consequence, the degree of polycondensation of the reaction material increases due to the downwardly increasing caloric condition within the reaction vessel. As a result the concentration of the solution increases downwardly at the ratio of about 1:4 to 1:8 while towards the upper part of the vessel the ethylene glycol liberated during the reaction becomes enriched and is discharged by removal from the reaction mixture together with the solvent undergoing vaporization at the upper part of the vessel. In order to remove traces of the liberated ethylene glycol that are found in the lower part of the reaction vessel, it has been found advisable to conduct through the vessel, in countercurrent, vaporized aromatic solvents which consist of compounds having two cyclic nuclei, these nuclei being either linked directly or through —O—, —[CH$_2$]$_n$— groups ($n=1-4$), and either or both nuclei may be partially or completely hydrogenated. Such solvents are, for example, α-methyl naphthalene, diphenyl, diphenyl oxide, tetrahydronaphthalene, etc. Whereas the quantity of the solvent, in batchwise operations remains uniform during the reaction and an end product is obtained during such polycondensation reaction wherein the viscosity and concentration remain uniform throughout, in a continuous operation the process is characterized by the formation of layers or strata of different viscosities superimposed in the reaction vessel. The highest viscosity is that of the lower layer and the lowest viscosity is that of the uppermost layer, which results in a very carefully and readily controllable progress of the condensation reaction. Such superimposition of layers, or stratification is due to the fact that with increasing temperature the strata of the lower zones become impoverished in solvent content. Since on the other hand, the polycondensation progresses with increasing temperatures the viscosity of the solution increases in the downward direction. These differences in viscosities are generally sufficient to preclude turbulence in the reaction vessel. With larger sized reaction chambers, the hazard of turbulence can be controlled by providing additional horizontal obstructions or baffles or filler bodies.

A specific advantage of the continuous operation in accordance with this invention is that the solvent which distills off from the upper part of the reaction vessel can be admitted or introduced into the lowest layer after it has been liberated from the ethylene glycol. As a result, a practically unchanged quantity of solvent may be used to carry out the polycondensation of a nearly unlimited quantity of ethylene glycol terephthalate. Such a result is impossible of accomplishment in batchwise operations since such operations cause considerable loss of solvent.

A further advantage of the method of this invention is that a highly concentrated solution of the polycondensate can be discharged from the lowest part of the reaction vessel which can be either poured or cast in the form of ribbons by known methods or which can immediately be spun into fibers or threads having a low solvent content. A solution of polycondensate thus formed can also be directly manufactured into film. It is further possible to operate with a solvent mixture composed of two solvents having different boiling points. A solvent mixture of this type is admitted into the bottommost zone of the reaction vessel.

The selection of temperature and temperature differences depends upon the particular compounds used as solvents. If for instance, α-methylnaphthalene (boiling point 247.5° C.) is used as the solvent, the temperatures are selected which increase from the top to the bottom up to 230° C., maximum 260° C. The use of higher boiling solvents (such as diphenyl methane, boiling point 261° C.) obviously necessitates the provision of a considerable elevation of the temperature in the tube or shaft.

The reaction can also be conducted in two or more reaction vessels connected in series to obtain apparatus having a structural height which is less than that when only one vessel is employed.

The following are examples in accordance with this invention.

*Example 1*

The process is carried out in a vertically disposed tube loaded with packing having an inner diameter of 85 millimeters. The tube consists of five sections each one meter long. The individual sections are heated so that the temperature of the reaction vessel increases from the top towards the bottom from 235° to 265° C. The diglycol terephthalate, the starting material, is admitted continuously through the head of the reaction column into an upper section heated to 235° C. The input of the starting material is 1140 grams per hour, dissolved in 650 grams of α-methylnaphthalene, and having a temperature of 185° C. At the same time a vapor current of α-methylnaphthalene heated to 260° is admitted into the lower section, No. 5, in a quantity of about 300 grams per hour. The completely condensed polyethylene terephthalate after remaining in the filled reaction chamber for about 16 to 20 hours is continuously conducted into a chamber having a capacity of about one liter disposed below section No. 5. From this chamber the content thereof, at a temperature of 260° C., is continuously pressed through a nozzle by a pump having a throughput capacity of 1100 grams per hour. The threads or fibers, spooled in accordance with the conventional procedures, contain about 10 percent by weight of α-methylnaphthalene.

*Example 2*

The process is carried out in the same manner as described in Example 1 except that the individual sections are heated to temperatures rising from 225° C. to 250° C. The glycol terephthalate is dissolved to the amount of 1150 grams in a mixture of 435 grams of α-methylnaphthalene and 220 grams of tetrahydronaphthalene, and is admitted, into the upper section, at a temperature of 185° C. while a current of tetrahydronaphthalene vapor heated to 250° C. and containing 15 percent of α-methylnaphthalene is introduced into the lower section at the rate of 300 grams per hour. The split off glycol escapes in admixture with tetrahydronaphthalene and a small quantity of the methylnaphthalene through the upper section. The solvent mixture liberated from the glycol is then refluxed. As described in Example 1, the completely condensed polyethylene terephthalate is continuously withdrawn at a temperature of 250° C. and is pressed through a spinning nozzles at a rate of 1050 grams. The fibers thus obtained contain about 6 percent of α-methylnaphthalene. Those fibers after removal of the α-methylnaphthalene have a solution viscosity of $\eta$ rel. 1.64 (calculated as a 1 percent solution in m-cresol at 25° C.).

We claim:

1. Process of continuously carrying out the polycondensation of diol esters of terephthalic acid in an organic solvent of the group of compounds and mixtures of said compounds selected from the class consisting of two cyclic nuclei linked directly to each other and two cyclic nuclei linked by a member of the group consisting of —O—, and —[CH$_2$]$_n$—, $n$ being an integer in the series 1 to 4, and wherein the hydrogenation of the nuclei ranges from the partial to the complete state, and wherein said nuclei may carry inert nuclear substituents which comprises introducing the diol ester dissolved in said solvent into a standing reaction vessel at the top thereof, the reaction vessel being heated to a temperature increasing from 220° C. and 265° C. from the top towards the bottom, while a current of said solvent in vaporized form is conducted from the bottom towards the top of the reaction vessel at such rate that the quantity of the said solvent in the upper part of the reaction vessel is 4 to 8 times that of the quantity of the said solvent in the lower part of the reaction vessel whereby the polycondensate and the solvent in reduced amount ready for spinning may be withdrawn from the lower part of the reaction vessel.

2. Process in accordance with claim 1 wherein the solvent is α-methylnaphthalene.

3. Process in accordance with claim 2 wherein the solvent is a mixture of α-methylnaphthalene and tetrahydronaphthalene.

4. Process of carrying out the polycondensation of diol esters of terephthalic acid which comprises introducing a solution of the ester in a solvent of the group of compounds and mixtures of said compounds selected from the class consisting of two cyclic nuclei linked directly to each other and two cyclic nuclei linked by a member of the group consisting of —O—, and —[CH$_2$]$_n$—, $n$ being an integer in the series 1 to 4, and wherein the hydrogenation of the nuclei ranges from the partial to the complete state, and wherein said nuclei may carry inert nuclear substituents at the head of a reaction vessel, passing the solution downwardly through said reaction vessel while the temperature therein increases from the top to the bottom in the range of about from 220° C. to 265° C., introducing a current of the solvent in vapor form at the bottom of the reaction vessel, whereby the solvent content is reduced in an amount to provide a mass consisting of a polycondensate and the solvent ready for spinning, and withdrawing the said mass of polycondensate and solvent from the bottom of said reaction vessel.

References Cited in the file of this patent

UNITED STATES PATENTS

| | | |
|---|---|---|
| 2,375,256 | Soday | May 8, 1945 |
| 2,597,643 | Izard et al. | May 20, 1952 |

OTHER REFERENCES

Sunderland: J. Applied Chem., August 1, 1951, pages 360–363.